UNITED STATES PATENT OFFICE.

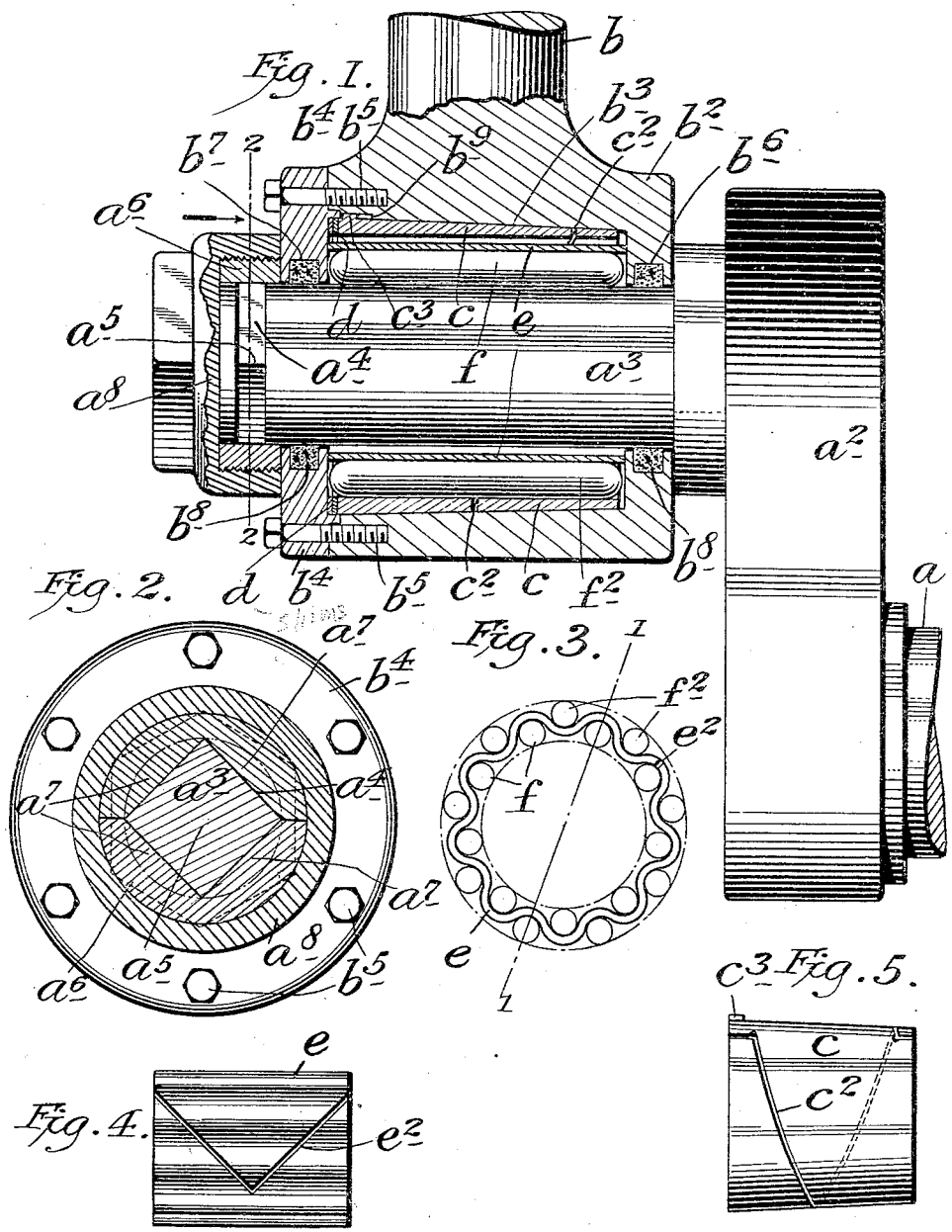

JOHN NEWMANN, OF BROOKLYN, NEW YORK.

ANTIFRICTION ROLLER-BEARING.

No. 921,442.  Specification of Letters Patent.  Patented May 11, 1909.

Application filed September 25, 1908. Serial No. 454,708.

*To all whom it may concern:*

Be it known that I, JOHN NEWMANN, a citizen of the United States, and residing at Brooklyn, in the county of Kings and State of New York, have invented certain new and useful Improvements in Antifriction Roller-Bearings, of which the following is a specification, such as will enable those skilled in the art to which it appertains to make and use the same.

This invention relates to roller bearings for use in connection with crank shafts and crank rods, and journals of various kinds and classes, and the object thereof is to provide an improved bearing of this class which may also be used on the journals or spindles of the axles of vehicles and wherever such bearings are required.

The invention is fully disclosed in the following specification, of which the accompanying drawing forms a part, in which the separate parts of my improvement are designated by suitable reference characters in each of the views, and in which;—

Figure 1 is a longitudinal sectional view of my improved bearing shown in connection with the crank pin or journal of a crank shaft and the head of a crank rod, the section through the movable parts of the bearing being on the line 1—1 of Fig. 3, Fig. 2 a section on the line 2—2 of Fig. 1, Fig. 3 an end view of the movable parts of the bearing, Fig. 4 a side view of a corrugated tubular retainer which I employ for holding the anti-friction rollers of the bearing in place, Fig. 5 a side view of a bushing which is placed in the head or housing through which the crank pin or journal passes and within which the movable parts of the bearing are placed.

In the drawing forming part of this specification, I have shown at $a$ a crank shaft provided with a crank $a^2$ having a crank pin $a^3$ together with a crank rod $b$ having a head $b^2$ through which the crank pin $a^3$ passes, and which forms the housing of my improved anti-friction roller bearing. The crank pin $a^3$ passes longitudinally through the head or housing $b^2$, and formed in the head or housing $b^2$ around the crank pin $a^3$ is a chamber $b^3$ which is preferably tapered slightly from one end to the other, and the chamber $b^3$ is closed at the end opposite the crank $a^2$ by a plate $b^4$ secured to the head or housing $b^2$ by screws $b^5$ or in any desired manner, and the end wall of the head or housing $b^2$ adjacent to the crank $a^2$ is provided with an annular packing chamber $b^6$, and the plate $b^4$ is provided with a similar annular packing chamber $b^7$, and placed in the packing chambers $b^6$ and $b^7$ are packings $b^8$. The crank pin or journal $a^3$ projects through or beyond the head or housing $b^2$ and is provided with an angular groove $a^4$ forming a rectangular neck $a^5$ as shown in Fig. 2, and placed on the outer end of the crank pin or journal $a^3$ is a collar $a^6$ composed of two separate parts and provided with web members $a^7$ which fit in the angular groove $a^4$, and the collar $a^6$ is threaded on its outer surface, and screwed thereonto is a cap $a^8$ which securely holds the head or housing $b^2$ in proper position on the crank pin or journal $a^3$.

Within the chamber $b^3$ of the head or housing $b^2$ is placed a bushing $c$, the outer surface of which is tapered to correspond with the taper of the outer walls of the chamber $b^3$, and said bushing is split longitudinally and spirally as shown at $c^2$, and the larger end thereof is provided with a lug $c^3$ which fits in a longitudinal groove $b^9$ in the wall of the chamber $b^3$, and placed in the outer end of said chamber are rings $d$ a greater or less number of which may be employed, and by means of which the position of the bushing $c$ may be adjusted in the chamber $b^3$, or said bushing may be forced farther into said chamber as will be readily understood.

Within the chamber $b^3$ in the head or housing $b^2$ and between the crank pin or journal $a^3$ and the bushing $c$ is placed a longitudinally corrugated retaining sleeve $e$ between which and the crank pin or journal $a^3$ are placed anti-friction rollers $f$, and between which and the bushing $c$ are placed similar anti-friction rollers $f^2$, and the rollers $f$ bear on the crank pin or journal $a^3$ while the rollers $f^2$ bear on the bushing $c$. The sleeve $e$ is also divided as shown at $e^2$ in such manner that the ends thereof inter-lock, this division of said sleeve as shown in Fig. 4 being V-shaped in form, but said division may be of other forms if desired.

The operation will be readily understood from the foregoing description, when taken in connection with the accompanying drawing and the following statement thereof. The rollers $f$ and $f^2$ bear respectively on the crank pin or journal $a^3$ and on the bushing $c$ and turn freely in the corrugations of the sleeve $e$, and in practice the said sleeve $e$ will also be carried around by the rollers $f$ and $f^2$ and the friction will be reduced to a minimum. The usual or any suitable means may be employed for oiling my improved bearing, and this may be done through the head or housing $b^2$ or through the plate $b^4$ at the outer end thereof. If, at any time, it becomes necessary to tighten the bearings and especially the anti-friction rollers $f$ and $f^2$ in their position the plate $b^4$ may be taken off and the housing $b^2$ forced inwardly and the number of the rings or bands $d$ increased and this, as will be understood, will diminish the diameter of the space within said housing and will also contract the sleeve $e$.

Having fully described my invention, what I claim as new and desire to secure by Letters Patent, is;—

1. A bearing for journals comprising a housing through which the journal passes, said housing being provided with an enlarged chamber, a longitudinally corrugated sleeve placed in said chamber and through which the journal passes, and anti-friction rollers placed on the inner and outer side of said sleeve.

2. A bearing for journals comprising a housing through which the journal passes, said housing being provided with an enlarged chamber, a longitudinally corrugated sleeve placed in said chamber and through which the journal passes, and anti-friction rollers placed between said sleeve and the journal and between the said sleeve and the walls of said chamber, said sleeve and said rollers being adapted to turn in said chamber.

3. A bearing for journals comprising a housing through which the journal passes, said housing being provided with an enlarged chamber, an adjustable bushing placed in said chamber and adapted to fit the outer walls thereof, a longitudinally corrugated sleeve placed between the bushing and the journal, and anti-friction rollers placed between said sleeve and the journal, and between said sleeve and the bushing.

In testimony that I claim the foregoing as my invention I have signed my name in presence of the subscribing witnesses this 24th day of September, 1908.

JOHN NEWMANN.

Witnesses:
A. R. APPLEMAN,
C. E. MULREANY.